March 22, 1966  YUTAKA TANAKA  3,242,406
BRUSHLESS D.C. MOTORS

Filed Oct. 21, 1963  3 Sheets-Sheet 1

Inventor
Yutaka Tanaka
By Stevens, Davis, Miller & Mosher
ATTORNEYS

March 22, 1966 YUTAKA TANAKA 3,242,406
BRUSHLESS D.C. MOTORS

Filed Oct. 21, 1963 3 Sheets-Sheet 2

Inventor
Yutaka Tanaka
By Stevens, Davis, Miller & Mosher
ATTORNEYS

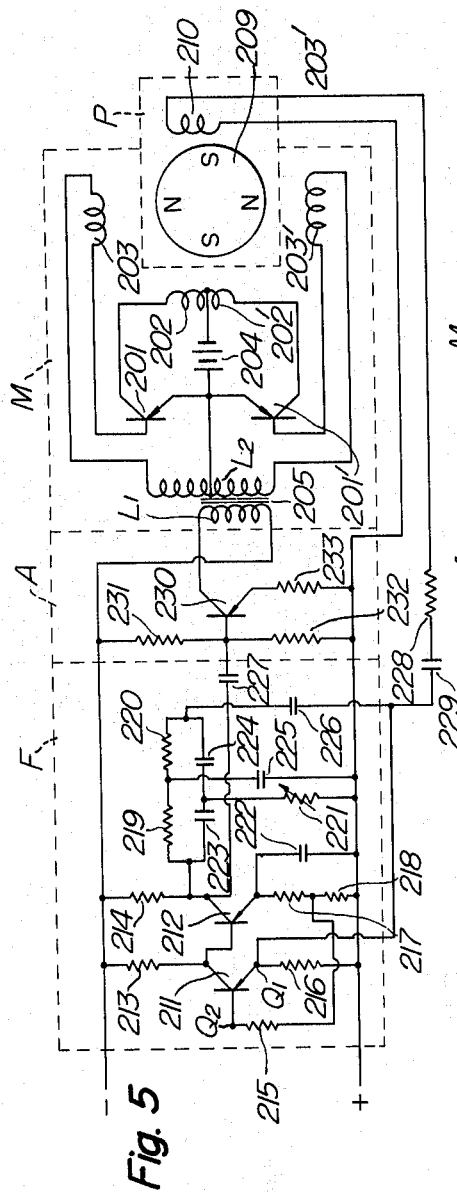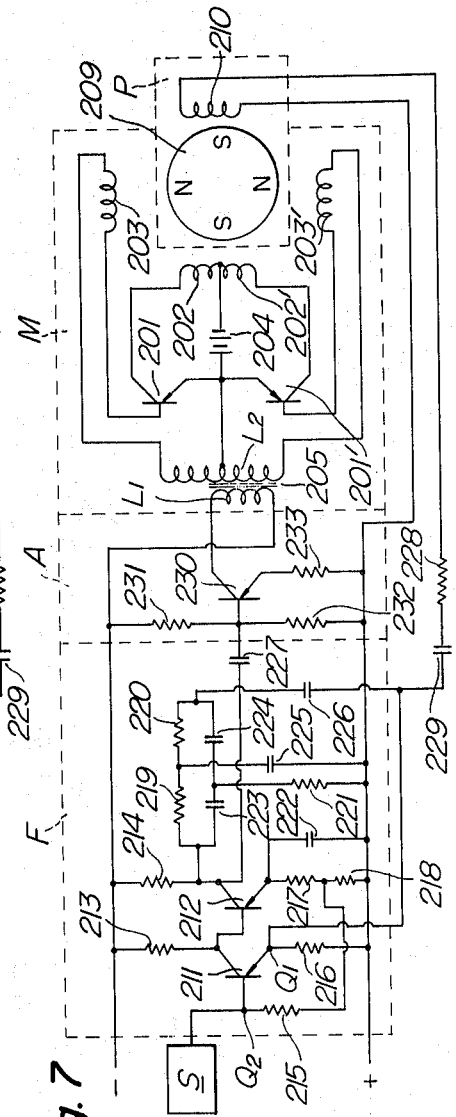
Fig. 5
Fig. 7

United States Patent Office 3,242,406
Patented Mar. 22, 1966

3,242,406
BRUSHLESS D.C. MOTORS
Yutaka Tanaka, Kobe, Japan, assignor to Matsushita Electric Industrial Co., Ltd., Osaka, Japan, a corporation of Japan
Filed Oct. 21, 1963, Ser. No. 317,644
Claims priority, application Japan, Oct. 25, 1962, 37/47,724; Dec. 27, 1962, 37/80,231; Mar. 11, 1963, 38/12,877; Sept. 5, 1963, 38/48,269, 38/48,270
13 Claims. (Cl. 318—138)

The present invention relates to a brushless D.C. motor wherein field coils are composed of coils of a switching circuit having switching elements such as transistors or semiconductor rectifiers with control electrodes, and a rotor of a permanent magnet is provided so that the permanent magnet rotor is continuously rotated by an electromagnetic force between the rotor and a magnetic field induced in the field coils by the action of the switching circuit, and such switching action of the switching circuit is controlled as required by an external synchronizing signal having a stable frequency and phase so as to synchronize a rotational speed of the permanent magnet rotor with a synchronous speed corresponding to the frequency of said external synchronizing signal.

The invention is characterized in that a buffer circuit such as an oscillator or filter is connected to the control side of a motor driving circuit comprising the switching circuit, said buffer circuit being operative to provide an output having a frequency and phase variable relative to a rotating condition of said permanent magnet rotor.

An object of the invention is to provide a brushless D.C. motor which has a speed-torque characteristic highly analogous to a characteristic of a sychronous motor and which can be easily operated in synchronism with an extremely stable external synchronizing signal while holding such characteristic.

Another object of the invention is to provide a brushless D.C. motor wherein speed regulation is attained by varying a circuit constant of a buffer circuit connected to the control side of a motor driving circuit to thereby vary an output frequency of said buffer circuit to be impressed on said control side.

According to the invention, there is provided a brushless D.C. motor comprising a driving circuit having field coils composed of coils of a switching circuit including switching elements, a rotor of a permanent magnet, and a buffer circuit connected to the control side of said driving circuit, said buffer circuit being operable to provide an output having a frequency and phase variable relative to a rotating condition of said permanent magnet rotor.

There are other objects and particularities of the invention which will become obvious from the following description with reference to the accompanying drawings, in which:

FIG. 5 is an electrical circuit diagram of still another embodiment of the invention;

FIG. 7 is an electrical circuit diagram of a further embodiment of the invention.

Figure 2:
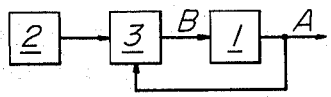
FIG. 2 is a block diagram of the circuit shown in FIG. 1.

At first, referring to FIG. 2, there is shown a basic block diagram according to the invention which includes a brushless D.C. motor 1, an oscillator 2 for emitting an extremely stable external synchronizing signal with which said motor 1 is made to be synchronized, and a buffer oscillator 3 connected to the control side of said motor 1. The oscillator 2 may be replaced by a circuit which receives an external synchronizing signal transmitted thereto. But, it may be understood that the oscillator or circuit 2 is not necessarily required in the invention and it is connected to the system only when it is desired to operate the motor 1 in synchronous relation with the stable external signal. Further, in the buffer oscillator 3, a frequency or phase of its output is variable to some extent due to variation of an input signal.

Figure 1:
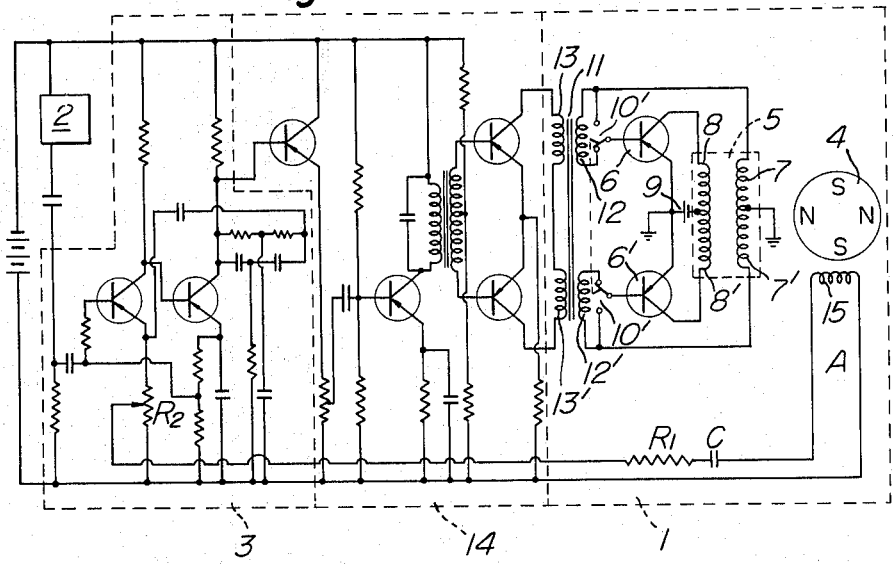
FIG. 1 is an electrical circuit diagram of an embodiment of a brushless D.C. motor of the invention.

The brushless D.C. motor will be explained in more details with reference to FIG. 1. The motor 1 comprises a permanent magnet rotor 4 and stator field coils 5, as shown in FIG. 1. The field coils 5 comprise base coils 7 and 7', and collector coils 8 and 8' of a switching circuit wherein transistors 6 and 6' are connected in the push-pull manner. The collector coils 8 and 8' are connected through a D.C. source 9 to the respective emitters and collectors of the transistors 6 and 6', while the base coils 7 and 7' are connected through change-over switches 10 and 10' to the bases and emitters of the transistors 6 and 6', respectively. Further secondary coils 12 and 12' of a coupling transformer 11 are connected through said change-over switches 10 and 10' to the emitters and bases of the transistors 6 and 6', respectively. An external signal is impressed on a primary coil 13 of said coupling transformer 11.

The oscillator 2 of an external sychronizing signal is a hard oscillator having extremely high stability in its output frequency as well as phase, and a crystal oscillator, Pielefork oscillator, synchronizing television signal transmitted, synchronizing signal for phototelegraphy or the frequency of commercial A.C. source may, for example, be used. While, the buffer oscillator 3 is such that its output frequency or phase is slightly variable due to magnetic disturbance in the motor 1 transmitted thereto through the coupling transformer 11, feedback of a signal voltage induced in a pick-up coil 15 during the rotation of the permanent magnet rotor 4, or a signal from the external synchronizing signal oscillator 2. When the external synchronizing signal oscillator 2 is connected, the intrinsic frequency of the buffer oscillator 3 is settled near to the signal frequency of the external synchronizing signal oscillator 2. As will be seen in FIG. 1, the buffer oscillator 3 and the external synchronizing signal oscillator 2 are connected through an amplifier 14 to the primary coil 13 of the coupling transformer 11 disposed in the transistor switching circuit of the motor 1.

In the pick-up coil 15, voltage is induced by the rotation of the permanent magnet rotor 4, and the pick-up coil 15 is connected to an emitter resistance $R_2$ of a transistor T of the buffer oscillator 3 through a resistance $R_1$ and a condenser C so that the signal voltage induced in the pick-up coil 15 relative to the rotating phase of the permanent magnet rotor 4 can be fed back to the buffer oscillator 3. However, this pick-up coil 15 is not necessarily required and may be provided when so required. Further, a Hall element or magnetic head may be substituted for the pick-up coil if such element is adapted to detect the rotating phase of the motor.

The brushless D.C. motor operates in the following manner. When the permanent magnet 4 starts rotation, the switching action of the transistors 6 and 6' is controlled by a control voltage induced in the base coils 7 and 7' by the rotation of the rotor 4. Then, a current flowing through the collector coils 8 and 8' excites the stator field poles, and a driving force is imparted to the permanent magnet rotor 4 for continuous rotation thereof.

Then, when an external synchronizing signal is impressed on the primary of the coupling transformer 11, the external synchronizing signal will control the switching action of the transistors 6 and 6' which control the exciting current flowing through the collector coils 8 and 8' constituting the field coils 5. Thus, the permanent magnet rotor 4 rotates at a synchronous speed corresponding to the frequency of the external synchronizing signal.

It will be apparent that the permanent magnet rotor 4 is extremely difficult to be pulled into synchronism with the external synchronizing signal and hunting may occur, in such a case the external synchronizing signal impressed on the transistor switching circuit is devoid of any versatility under a condition in which the frequency and phase of the external signal applied to the transistor switching circuit of the motor are extremely stable and free from any fluctuation, that is, under a condition in which only the oscillator 2 is directly connected to the primary side of the coupling transformer 11.

According to said embodiment of the invention, however, the stable external synchronizing signal oscillator 2 having little liability to variation in the frequency and phase, and the buffer oscillator 3 for developing the output with the frequency and phase variable by an external condition are connected to the transistor switching circuit of the motor 1. According to the invention, the feedback action of the motor output signal A induced in the pick-up coil 15 relative to the rotating phase of the permanent magnet rotor 4 is not applied to the buffer oscillator 3 until some phase variation is created between the motor output signal A and the oscillating output B of the buffer oscillator 3, operation of which can thereby be regulated by the output signal A. Under a normal operating condition, no feedback action of the output signal A will be applied to the buffer oscillator 3, provided that the output signal A of the motor 1 is taken out in a manner that there is a suitable phasic relation between the output signal A and the oscillating output B of the buffer oscillator 3.

As will be apparent from the foregoing description, the buffer oscillator 3 is operative to vary the frequency and phase of its oscillating output by being influenced by the output signal A of the motor 1 and the external synchronizing signal generated by the oscillator 2. Any phase variation between the output signal A and the external synchronizing signal will result in the phase variation between the output signal A and the oscillating output B of the buffer oscillator 3. As a result thereof, the feedback action of the output signal A is exerted on the buffer oscillator 3 to cause the phase of the oscillating output B to vary in synchronism with the phase of the output signal A to thereby suppress the hunting of the permanent magnet rotor 4. Subsequently, the oscillation of the buffer oscillator 3 will gradually approach the external synchronizing signal generated by the oscillator 2, and the permanent magnet rotor 4 will rotate in synchronism with the extremely stable external synchronizing signal in an unobstructed manner and without causing any hunting. Thus, the motor rotates free from hunting and pull-out of the motor can be prevented even with short-time interruption of the external synchronizing signal.

When the oscillator 2 for generating the stable external synchronizing signal is not especially connected, the motor will readily be synchronized at a number of revolutions corresponding to the output frequency of the buffer oscillator 3, and the speed-torque characteristic of the motor will closely approximate to the characteristic of a synchronous motor.

Next, description will be made with reference to another embodiment illustrated in FIGS. 3 and 4. The brushless D.C. motor of FIG. 3 comprises a permanent magnet rotor 101, and driving field coils 102 connected through a power source 105 to the emitters and collectors of transistors 103 and 104 acting as switching elements. A control coil 106 is provided to generate a control signal which is overlapped on an output signal of a buffer oscillator 107 (twin-T oscillator) or which may be used to modulate the signal of the buffer oscillator 107. The signal generated in the control coil 106 corresponds to a rotating phase of the permanent magnet rotor 101.

A control coil 108 is further provided to impress a feedback control signal on the buffer oscillator 107 for the purpose of facilitating the pull-in of the rotor in synchronism with a frequency of the external synchronizing signal. As in the case of the control coil 106, the signal generated in the coil 108 corresponds to the rotating phase of the permanent magnet rotor 101. An input for controlling the action of the switching transistors 103 and 104 is transmitted through an input transformer 109, and one of the features of the embodiment resides in that the transistors 103 and 104 are controlled solely by the signal admitted through the input transformer 109 and not by any other control signals. In order to synchronize the buffer oscillator 107 with the external synchronizing signal $f$, not only in frequency but also in phase, an input terminal 110 is provided for admitting such external signal therethrough, and is used when the motor is rotated in synchronism with a signal such as vertical synchronizing signal for television, synchronizing signal for telephotography, frequency of a commercial source or signal from a separate oscillator.

In the above embodiment, such switching elements as semiconductor rectifiers with control electrodes may be used in lieu of the transistors 103 and 104 or a common coil may be used in place of the coils 106 and 108. Further, the purpose of the invention may equally sufficiently be utilized even when the external synchronizing signal $f$ is not applied. In this case, the motor rotates in synchronism with the frequency of the buffer oscillator 107, and any variation in the frequency will be followed by the corresponding variation in the number or revolutions. Therefore, the external synchronizing signal $f$ normally considerably approximates to the frequency of the buffer oscillator 3.

Figure 3:
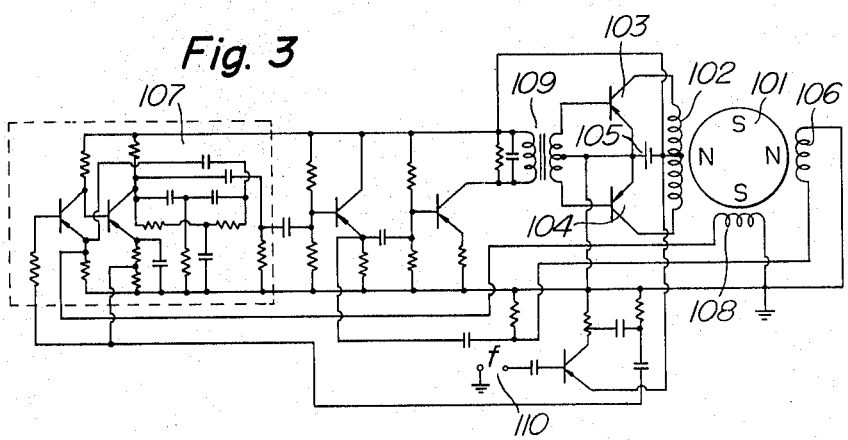
FIG. 3 is an electrical circuit diagram of another embodiment of the invention.

A significant feature of the motor of FIG. 3 resides in that the switching elements are not directly controlled by a voltage induced by the rotation of the motor. By virtue of such feature, it is easy to attain the matching between the switching elements and the control signal admitted through the input transformer, and it is also easy to eliminate the instability frequently caused by the positive feedback coil on the base side after the synchronization has been made. Another feature of the embodiment resides in that the control signal for the switching elements is obtained by overlapping the signal by the rotor on the output signal of the buffer oscillator 107 or by modulating the output signal of the buffer oscillator 107. By virtue of such feature, the revolution of the motor is quickly increased after it has been started and the motor is automatically pulled into synchronism with the signal of the buffer oscillator 107, which obviates the need of a pull-in device. Since, further, the control signal of an extremely low level will suffice, the motor will be improved in dimensions and can be made small in size. Still another feature resides in that a second feedback signal is impressed on the buffer oscillator 107 in order to suppress instability or sunting in the synchronous motor even when the external synchronizing signal $f$ is impressed thereon.

Figure 4:
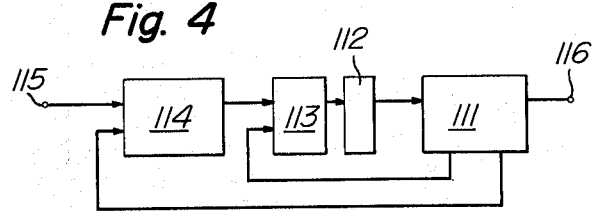
FIG. 4 is a block diagram of the circuit shown in FIG. 3.

FIG. 4 shows a block diagram of the brushless D.C. motor illustrated in FIG. 3. In FIG. 4, the motor proper is shown at 111, and the driving circuit including the switching elements is designated by 112, while numerals 113 and 114 designate the amplifier section including the control elements, and the buffer oscillator section, respectively. The terminal for admitting the external synchronizing signal and the motor output terminal are shown by 115 and 116, respectively.

Figure 6:
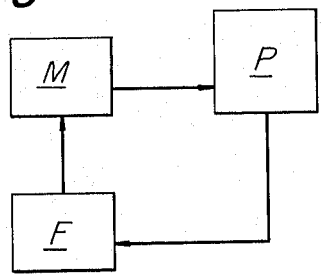
FIG. 6 is a block diagram of the circuit of FIG. 5.

FIGS. 5 and 6 show an embodiment of the invention wherein a filter is used to form a buffer circuit. A driving circuit M shown in FIGS. 5 and 6 is a push-pull type transistor switching circuit which comprises transistors 201 and 201', driving coils 202 and 202', control coils 203 and 203', and a D.C. source 204. A secondary coil $L_2$ of a coupling transformer 205 is connected to the base circuits of the transistors. The driving coils 202 and 202' act as stator field coils of the motor having a permanent magnet rotor 209. A feedback coil 210 is disposed to have a suitable phase difference with respect to the driving coils 202 and 202' and arranged to induce a voltage corresponding to the rotating phase of the permanent magnet rotor 209. The feedback coil 210 corresponds to a detection circuit P of FIG. 6.

Symbol F designates a twin-T band pass filter which comprises transistors 211 and 212, resistances 213, 214, 215, 216, 217, 218, 219, 220 and 221, and the condensers 222, 223, 224, 225, 226 and 227. A signal voltage induced in the feedback coil 210 is fed back to a point $Q_1$ of the twin-T band pass filter F through a resistance 228 and a condenser 229, and output terminals of said twin-T band pass filter F are connected to an input side of an amplifier A. Said amplifier A comprises a transistor 230 and resistances 231, 232 and 233, and is connected to a primary coil $L_1$ of the coupling transformer 205.

Figure 8:
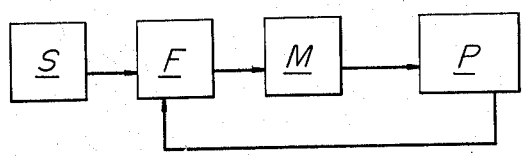
FIG. 8 is a block diagram of the circuit of FIG. 7.

FIGS. 7 and 8 show an embodiment of the invention wherein a brushless D.C. motor is synchronized with an external synchronizing signal S having a stable frequency. The circuit of FIG. 7 is similar to the one shown in FIG. 5 and reference numerals similar to those of FIG. 5 are used throughout FIG. 7. In FIG. 7, the stable external synchronizing signal S with which the motor is synchronized is impressed on a point $Q_2$ of a band pass filter F.

Although the signal induced in the feedback coil 210 is fed back to the band pass filter F at the point $Q_1$, it may be fed back to the point $Q_2$ or any other suitable points. Further, the signal induced in the feedback coil 210 may be subjected to phase shifting by means of a phase shifter on its way to the band pass filter F. Still further, the value of the variable resistance 221, for example, may be varied to vary the center frequency of the output of the twin-T band pass filter F.

Upon rotation of said motor, the signal corresponding to the rotating phase of the permanent magnet rotor 209 is fed back to the motor driving circuit M through the filter F. In conjunction therewith, it will be understood that the motor rotates most stably at a number of revolutions at which the feedback of the signal corresponding to the rotating phase of the permanent magnet rotor 209 is close to positive feedback, that is, in a positive feedback condition wherein a loop gain G of the feedback circuit at a feedback frequency $f'$ from the motor has a value of the relations, $|G| \geq 1$ and $\angle G = 0$ approximately.

In the embodiments of the invention, advantage of such characteristic is fully taken to improve and stabilize the characteristic of the motor, which rotates most stably at such number of revolutions as will provide a loop gain of the feedback circuit in the form of positive feedback. Such number of revolutions can be automatically reached as soon as the motor is started and the motor has an excellent characteristic free from variation in its number of revolutions.

When it is so selected that positive feedback can be exactly obtained at the center frequency of the output of the band pass filter F, rotation of the permanent magnet rotor 209 is steadied at the number of revolutions corresponding to said frequency. Therefore, the permanent magnet rotor 209 can extremely easily be rotated in synchronism with the external synchronizing signal S having a highly stable frequency and phase, provided that the frequency of said external synchronizing signal S corresponds with the center frequency of the output of the band pass filter F.

Further, speed regulation can be attained by feeding back the signal corresponding to the rotating phase of the permanent magnet rotor 209 to the motor driving circuit M through the filter F and by varying the phase of the fed back signal or the constant of the feedback circuit to thereby vary the frequency characteristic of the filter F. Or more precisely, by taking advantage of the characteristic of the brushless D.C. motor that the motor most stably rotates in the condition wherein the feedback of the signal corresponding to the rotating phase of the permanent magnet rotor is always analogous to positive feedback, that is, at the number of revolutions at which it is possible obtain the positive feedback state wherein the loop gain G of the feedback circuit at the feedback frequency $f'$ from the motor has the value analogous to the relation, $|G| \geq 1$ and $\angle G = 0$, the phase of the fed back signal or the constant of the feedback circuit is varied to vary the frequency characteristic of the filter, in order to thereby vary the number of revolutions at which the signal corresponding to the rotating phase of the permanent magnet rotor is subject to positive feedback. It will be seen that the speed regulation of the motor can thus be attained.

What is claimed is:

1. A brushless D.C. motor comprising a driving circuit, a switching circuit, said switching circuit containing coils and switching elements, said driving circuit comprising magnetic field coils and said switching coils, a rotor including a permanent magnet, a circuit for detecting the rotary phase of said rotor, a buffer circuit with said detector signal acting as an input signal, said buffer circuit impressing on an output signal a phase lag relative said input signal to control a controlling portion of said driving circuit, and a feedback circuit feeding back the rotary phase detector signal to said driving circuit, the output of said feedback circuit and the output of said buffer circuit being simultaneously impressed on the controlling side of said driving circuit as a controlling signal.

2. A brushless D.C. motor according to claim 1, wherein said buffer circuit takes the form of an oscillator.

3. A brushless D.C. motor according to claim 1, wherein said buffer circuit takes the form of a filter.

4. A brushless D.C. motor comprising a driving circuit having field coils composed of coils of a switching circuit including switching elements, a rotor including a permanent magnet, a buffer circuit connected to the control side of said driving circuit, said buffer circuit being operable to provide an output having a frequency and phase variable relative to a rotating condition of said rotor, and means for feeding back a signal corresponding to a rotating phase of said permanent magnet rotor to said buffer circuit.

5. A brushless D.C. motor according to claim 4, wherein said buffer circuit takes the form of an oscillator.

6. A brushless D.C. motor according to claim 4, wherein said buffer circuit takes the form of a filter.

7. A brushless D.C. motor according to claim 4, wherein said buffer circuit takes the form of a filter in which its output frequency response is variable by varying its circuit constant.

8. A brushless D.C. motor comprising a driving circuit having field coils composed of coils of a switching circuit including switching elements, a rotor including a permanent magnet, a buffer circuit connected to the control side of said driving circuit, said buffer circuit operable to provide an output having a frequency and phase variable relative to a rotating condition of said rotor, and means for impressing an external synchronizing signal having a stable frequency on said buffer circuit.

9. A brushless D.C. motor according to claim 8, wherein said buffer circuit takes the form of an oscillator.

10. A brushless D.C. motor according to claim 8, wherein said buffer circuit takes the form of a filter.

11. A brushless D.C. motor comprising a driving circuit having field coils composed of coils of a switching circuit including switching elements, a rotor of a permanent magnet, a buffer circuit connected to the control side of said driving circuit, said buffer circuit being operable to provide an output having a frequency and phase variable relative to a rotating condition of said permanent magnet rotor, and means for feeding back a signal corresponding to a rotating phase of said permanent magnet rotor to said buffer circuit, and means for impressing an external synchronizing signal having a stable frequency on said buffer circuit.

12. A brushless D.C. motor according to claim 11, wherein said buffer circuit takes the form of an oscillator.

13. A brushless D.C. motor according to claim 11, wherein said buffer circuit takes the form of a filter, and an external synchronizing signal having a stable frequency close to an output frequency of said filter is impressed on said filter.

References Cited by the Examiner
UNITED STATES PATENTS

| | | | |
|---|---|---|---|
| 2,814,769 | 11/1957 | Williams | 318—138 X |
| 2,995,690 | 8/1961 | Lemon | 318—138 |

ORIS L. RADER, *Primary Examiner.*

JOHN F. COUCH, *Examiner.*

S. GORDON, *Assistant Examiner.*